United States Patent
Guo et al.

(10) Patent No.: US 12,001,388 B2
(45) Date of Patent: Jun. 4, 2024

(54) INFORMATION IMPORTING METHOD AND APPARATUS

(71) Applicant: DINGTALK HOLDING (CAYMAN) LIMITED, Grand Cayman (KY)

(72) Inventors: Jia Guo, Hangzhou (CN); Yuan Zhang, Hangzhou (CN); Ke Xu, Hangzhou (CN)

(73) Assignee: DINGTALK HOLDING (CAYMAN) LIMITED, Grand Cayman (KY)

( * ) Notice: Subject to any disclaimer, the term of this patent is extended or adjusted under 35 U.S.C. 154(b) by 89 days.

(21) Appl. No.: 17/704,708

(22) Filed: Mar. 25, 2022

(65) Prior Publication Data

US 2022/0214996 A1    Jul. 7, 2022

Related U.S. Application Data

(63) Continuation of application No. PCT/CN2020/116695, filed on Sep. 22, 2020.

(30) Foreign Application Priority Data

Sep. 27, 2019 (CN) .......................... 201910922815.8

(51) Int. Cl.
  *G06F 16/11*    (2019.01)
  *G06F 16/16*    (2019.01)
(52) U.S. Cl.
  CPC .......... *G06F 16/116* (2019.01); *G06F 16/168* (2019.01)

(58) Field of Classification Search
  CPC .... G06F 16/116; G06F 16/168; G06F 40/166; G06F 40/18; G06F 16/258; G06F 16/2282; G06F 16/252; H04L 67/06
  See application file for complete search history.

(56) References Cited

U.S. PATENT DOCUMENTS

| 8,392,419 B2 | 3/2013 | Heaton et al. |
| 8,606,624 B2 | 12/2013 | Harsh et al. |
| 8,660,876 B2 | 2/2014 | Woodings et al. |
| 9,208,474 B2 | 12/2015 | Mckeown et al. |
| 9,553,860 B2 | 1/2017 | Meyer |

(Continued)

FOREIGN PATENT DOCUMENTS

| CN | 102081664 A | 6/2011 |
| CN | 105094852 A | 11/2015 |

(Continued)

OTHER PUBLICATIONS

International Preliminary Report on Patentability Chapter I for PCT Application No. PCT/CN2020/116695 dated Apr. 7, 2022.

(Continued)

*Primary Examiner* — Angelica Ruiz

(57) ABSTRACT

Provided in one or more embodiments of the description are an information importing method and apparatus. The method may comprise: a server receiving an information importing file uploaded by a user, wherein the information importing file includes information to be imported into a system; the server verifying the information included in the information importing file; the server marking information in the information importing file that does not pass the verification, so as to generate an error comparison file; and the server returning the error comparison file to the user.

20 Claims, 16 Drawing Sheets

(56) References Cited

U.S. PATENT DOCUMENTS

| | | | |
|---|---|---|---|
| 9,613,190 | B2 | 4/2017 | Ford et al. |
| 9,811,576 | B2 | 11/2017 | Mcgregor et al. |
| 10,169,311 | B2 | 1/2019 | Myers et al. |
| 11,470,143 | B2* | 10/2022 | Joheb .................... H04L 67/06 |
| 2004/0024619 | A1* | 2/2004 | DiBella ................. G06Q 40/08 705/4 |
| 2014/0181021 | A1* | 6/2014 | Montulli ............... G06F 16/285 707/624 |
| 2015/0317290 | A1 | 11/2015 | Ahmed et al. |
| 2015/0346938 | A1* | 12/2015 | Gerhardt ............ G06Q 30/0276 715/723 |
| 2016/0019628 | A1 | 1/2016 | Udumudi et al. |
| 2016/0171434 | A1 | 6/2016 | Adden et al. |
| 2016/0350721 | A1 | 12/2016 | Comerford et al. |
| 2017/0116373 | A1 | 4/2017 | Ginsburg et al. |
| 2017/0147956 | A1 | 5/2017 | Stiffler et al. |
| 2017/0185754 | A1 | 6/2017 | Jefferson |
| 2017/0223068 | A1* | 8/2017 | Bhattacharjee ....... H04L 65/403 |
| 2018/0157468 | A1 | 6/2018 | Stachura |
| 2019/0243911 | A1* | 8/2019 | Kobozev ................ G16H 30/40 |

FOREIGN PATENT DOCUMENTS

| | | |
|---|---|---|
| CN | 108153550 A | 6/2018 |
| CN | 109189849 A | 1/2019 |
| CN | 109408783 A | 3/2019 |
| CN | 109710237 A | 5/2019 |
| CN | 110196971 A | 9/2019 |
| WO | 2018111588 A1 | 6/2018 |

OTHER PUBLICATIONS

First Search Report for Chinese Application No. 201910922815.8 dated Mar. 6, 2023.
Written Opinion of the International Searching Authority and International Search Report for PCT Application No. PCT/CN2020/116695 dated Dec. 2, 2020.
Search Report for Chinese Application No. 201910922815.8 mailed on Jan. 8, 2024.
Ramey et al., "High-Tech Publications Need Old-Fashioned Editing," IEEE IPCC 2000 / ACM 18th International Conference on Systems Documentation, Sep. 24, 2000.
Xu et al., "Design and Implementation of Online Editing in Jangsu Oil Field," Science Technology and Engineering, vol. 9, No. 14, Jul. 2009, abstract provided.

* cited by examiner

| Start | Insert | Page layout | | ... | |
|---|---|---|---|---|---|
| | A | B | C | D | E | F | |

| | A | B | C | D | E | F | |
|---|---|---|---|---|---|---|---|
| 1 | User ID | Name | Mobile phone number | Job number | Identity card address | Birth date | ... |
| 2 | 132456416 | Liu Yi | 186****1234 | 000001 | Hangzhou | 1985/11/12 | ... |
| 3 | 453416546 | Chen Er | 188****4562 | 000002 | Hangzhou | 1988/4/5 | ... |
| 4 | 134564656 | Zhang San | 186****3311 | 000003 | Beijing | 1992/6/8 | ... |
| 5 | 456456135 | Li Si | 181****0521 | 000004 | Hangzhou | 1979/6/20 | ... |
| 6 | 564654654 | Wang Wu | 139****4633 | 000005 | Hangzhou | 1995/12/12 | ... |
| 7 | 569548646 | Zhao Liu | 131****9999 | 000005 | Beijing | 1986/9/12 | ... |
| 8 | 645456541 | Sun Qi | 100****321 | 000007 | Hangzhou | 1993/7/4 | ... |
| 9 | 486456465 | Jiang Ba | 136****8852 | 000008 | Shanghai | 1990/1/31 | ... |
| 10 | 484561654 | | 131****0011 | 000009 | Beijing | 1987/11/4 | ... |
| ... | | | ... | | | ... | |

Employee data — 510

```
                                                                   ─60
┌─────────────────────────────────────────────────────────────────┐
│ Application T                                                   │
│                         Enterprise   Enterprise                 │
│         Contacts Workbench homepage    data      Settings       │
│         ────────                                                │
│    Internal contacts   Department    Smart       External       │
│      management       management    personnel    contacts       │
└─────────────────────────────────────────────────────────────────┘
```

Import personnel information in batches

| Import profile information of 300 personnel: | profile information of 283 personnel is successfully imported/there are problems in some content of 128 personnel | profile information of 17 personnel fails to be imported |

√ Profile information of 283 personnel is successfully imported

[ Edit sheet online ] — 620

× Profile information of 17 personnel fails to be imported, and there are four reasons as follows:

(1) Missing necessary information "Name" for three personnel:
 Please upload again after adding "Name"; having been marked in red in the file (2) Formats of mobile phone numbers of five personnel are incorrect:
 ...
 ⋮

!There are problems in some content of 128 personnel, and there are nine reasons as follows:

(1) The header is not recognized:
 The header "Identity card address" is not recognized, please modify to the specified header; having been marked in purple in the file (2) Header missing:
 ...
 ⋮

[ Download error sheet ]      [ Upload corrected sheet ]

FIG. 7

| | Start | Insert | Page layout | ... | | |
|---|---|---|---|---|---|---|
| | A | B | C | D | E | F |
| 1 | User ID | Name | Mobile phone number | Job number | Identity card address | Birth date |
| 2 | 1324564416 | Liu Yi | 186****1234 | 000001 | Hangzhou | 1985/11/12 |
| 3 | 4534164546 | Chen Er | 188****4562 | 000002 | Hangzhou | 1988/4/5 |
| 4 | 1345464656 | Zhang San | 186****3311 | 000003 | Beijing | 1992/6/8 |
| 5 | 4564561354 | Li Si | 181****0521 | 000004 | Hangzhou | 1979/6/20 |
| 6 | 5646546545 | Wang Wu | 139****4633 | 000005 | Beijing | 1995/12/12 |
| 7 | 5695486465 | Zhao Liu | 131****9999 | 000005 | Hangzhou | 1986/9/12 |
| 8 | 6454566541 | Sun Qi | 130****1321 | 000007 | Hangzhou | 1993/7/4 |
| 9 | 4864564654 | Jiang Ba | 136****8852 | 000008 | Shanghai | 1990/1/31 |
| 10 | 4845461654 | | 131****0011 | 000009 | Beijing | 1987/11/4 |
| ... | ... | ... | ... | ... | ... | ... |

Error description — 520
Employee data — 510
— 50

FIG. 8

| | Start | Insert | Page layout | ... | | |
|---|---|---|---|---|---|---|
| | A | B | C | | D | ... |
| 1 | | Import error description | Solution | | | ... |
| 2 | | Import failure | | | | ... |
| 3 | | "Name" of someone is not filled in | Add the person's name | | | ... |
| 4 | | The format of the mobile phone number is incorrect | If it is a foreign mobile phone number, the country code needs to be added | | | ... |
| ... | | ... | ... | | ... | ... |
| 7 | | There is a problem in imported content | | | | ... |
| 8 | | The header name is not recognized | Modify the header name with reference to "personnel profile fields"; add a new field to the "personnel profile fields" | | | ... |
| 9 | | Repeated job number | Modify the employee' name, to ensure no repetition | | ... | ... |
| ... | | ... | ... | | | |

Error description / Employee data

FIG. 9

| | Start | Insert | Page layout | ... | | | |
|---|---|---|---|---|---|---|---|
| | A | B | C | D | E | F | |
| | User ID | Name | Mobile phone number | Job number | Identity card address | Birth date | ... |
| 1 | 132456416 | Liu Yi | 186*****1234 | 000001 | Hangzhou | 1985/11/12 | ... |
| 2 | 45... | 13... | | 000002 | Hangzhou | 1988/4/5 | ... |
| 3 | 45... | | The format of the mobile phone number is incorrect | 000003 | Beijing | 1992/6/8 | ... |
| 4 | 56... | Zhao Liu | If it is a foreign mobile phone number, the country code needs to be added | 000004 | Hangzhou | 1979/6/20 | ... |
| 5 | | | 100**×1211 | 000005 | Hangzhou | 1995/12/12 | ... |
| 6 | | | 152 | 000006 | Beijing | 1986/9/12 | ... |
| 7 | 645456541 | Sun Qi | 136*****... | 000007 | Hangzhou | 1993/7/4 | ... |
| 8 | 486456465 | Jiang Ba | | 000008 | Shanghai | 1990/1/31 | ... |
| 9 | 484561654 | | 131*****0011 | 000009 | Beijing | 1987/11/4 | ... |
| 10 | ... | | ... | ... | ... | ... | ... |
| | Error description | Employee data | | | | | |

FIG. 10

| Application T | | | | | | |
|---|---|---|---|---|---|---|
| | Contacts Workbench | Department management | Enterprise homepage | Enterprise data | Smart personnel | Settings External contacts |
| Internal contacts management | | | | | | |

| Start | Insert | Page layout | ... | | | |
|---|---|---|---|---|---|---|
| | | | | | Invite other administrators to refine | |
| | A | B | C | D | E | F |
| 1 | User ID | Name | Mobile phone number | Job number | Identity card address | Birth date |
| 2 | 132456416 | Liu Yi | 186****1234 | 000001 | Hangzhou | 1985/11/12 |
| 3 | 453416546 | Chen Er | 188****4562 | 000002 | Hangzhou | 1988/4/5 |
| 4 | 134564656 | Zhang San | 186****3311 | 000003 | Beijing | 1992/6/8 |
| 5 | 456456135 | Li Si | 181****0521 | 000004 | Hangzhou | 1979/6/20 |
| 6 | 564654654 | Wang Wu | 139****4633 | 000005 | Hangzhou | 1995/12/12 |
| 7 | 569548646 | Zhao Liu | 131****9999 | 000005 | Beijing | 1986/9/12 |
| 8 | 645456541 | Sun Qi | 138****7671 | 000007 | Hangzhou | 1993/7/4 |
| 9 | 486456465 | Jiang Ba | 136****8852 | 000008 | Shanghai | 1990/1/31 |
| 10 | 484561654 | | 131****0011 | 000009 | Beijing | 1987/11/4 |
| ... | ... | ... | ... | ... | ... | ... |

Employee data

FIG. 11

| Application T | | | | Enterprise homepage | | | Settings |
|---|---|---|---|---|---|---|---|
| | Contacts | Workbench | | | Enterprise data | | |
| | Internal contacts management | | Department management | | Smart personnel | | External contacts |

Invite other administrators to refine — 60

| | Start | Insert | Page layout | ... | | | |
|---|---|---|---|---|---|---|---|
| | A | B | C | D | Identity | | |
| 1 | User ID | Name | Mobile phone number | Job number | | | |
| 2 | 132456416 | Liu Yi | 186****1234 | 000001 | Hangzh | | |
| 3 | 453416546 | Chen Er | 188****4562 | 000002 | Hangzh | | |
| 4 | 134564656 | Zhang San | 186****3311 | 000003 | Beijing | | |
| 5 | 456456135 | Li Si | 181****0521 | 000004 | Hangzh | | |
| 6 | 564654654 | Wang Wu | 139****4633 | 000005 | Beijing | | |
| 7 | 569548646 | Zhao Liu | 131****9999 | 000005 | Hangzh | | |
| 8 | 645456541 | Sun Qi | 131****131 | 000007 | Shangh | | |
| 9 | 486456465 | Jiang Ba | 136****8852 | 000008 | Beijing | | |
| 10 | 484561654 | | 131****0011 | 000009 | | | |
| ... | | | ... | | | | |

Employee data

— 630

Error prompt
▨ The header name is not recognized
You may select a similar field from the existing fields of the system for matching, or add a new field

— 640

Select a similar field for matching:
Search a field
Basic information
(Name) (Mailbox) (Department) (...)
Job information
(Employee type) (Employee state) (...)

Add a field: (Add now)

FIG. 12

| | A | B | C | D | |
|---|---|---|---|---|---|
| | User ID | Name | Mobile phone number | Job number | Identity |
| 1 | 132456416 | Liu Yi | 186****1234 | 000001 | Hangzhou |
| 2 | 453416546 | Chen Er | 188****4562 | 000002 | Hangzhou |
| 3 | 134564656 | Zhang San | 186****3311 | 000003 | Beijing |
| 4 | 456456135 | Li Si | 181****0521 | 000004 | Hangzhou |
| 5 | 564654654 | Wang Wu | 139****4633 | 000005 | Hangzhou |
| 6 | 569548646 | Zhao Liu | 131****9999 | 000006 | Beijing |
| 7 | 645456541 | Sun Qi | 101****4351 | 000007 | Hangzhou |
| 8 | 486456465 | Jiang Ba | 136****8852 | 000008 | Shanghai |
| 9 | 484561654 | | 131****0011 | 000009 | Beijing |

Error prompt

The format of the mobile phone number is incorrect

If it is a foreign mobile phone number, the country code needs to be added

Invite "Sun Qi" to refine

Invite other users to refine

FIG. 13a

INFORMATION IMPORTING METHOD AND APPARATUS

CROSS-REFERENCE TO RELATED APPLICATIONS

This application is a continuation application of International Patent Application No. PCT/CN2020/116695, filed on Sep. 22, 2020, and entitled "INFORMATION IMPORTING METHOD AND APPARATUS," which claims priority to Chinese Patent Application No. 201910922815.8, filed on Sep. 27, 2019 and entitled "INFORMATION IMPORTING METHOD AND APPARATUS." The entire contents of all of the above applications are incorporated herein by reference in their entirety.

TECHNICAL FIELD

One or more embodiments of this specification relate to the field of information technologies, and in particular, to an information importing method and apparatus.

BACKGROUND

In related technologies, a server can provide an interaction interface to a user through a web page or a client, for the user to fill in information based on the interaction interface, and upload the information to the server for processing or storage. However, if there is a relatively large amount of information to be uploaded, especially in a case where formats of the information are all the same or similar, for example, an enterprise administrator needs to upload personal profile information of all employees in an enterprise, the foregoing manner of filling in information online usually has low efficiency.

Therefore, the user may first collect information on a terminal (may also need to perform further information processing or information sorting), and subsequently record the collected information in a file (such as an Excel spreadsheet file). In this way, provided that the file is uploaded to the server, the server can perform content parsing and batch importing on the file, and then process or store the imported information. However, due to some reasons, for example, there is a relatively large quantity of fields included in the information or a relatively large quantity of pieces of information, some errors usually exist in the information recorded in the file.

SUMMARY

In view of this, one or more embodiments of this specification provide an information importing method and apparatus.

To achieve the foregoing objective, the one or more embodiments of this specification provide the following technical solutions.

According to a first aspect of the one or more embodiments of this specification, an information importing method is provided, including: receiving, by a server, an information importing file uploaded by a user, where the information importing file includes information to be imported into a system; verifying, by the server, the information included in the information importing file; marking, by the server, information in the information importing file that does not pass the verification, so as to generate an error comparison file; and returning, by the server, the error comparison file to the user.

According to a second aspect of the one or more embodiments of this specification, an information importing method is provided, including: uploading, by a terminal, an information importing file to a server, for the server to verify information included in the information importing file and import the information into a system; and receiving, by the terminal, an error comparison file returned by the server, where the error comparison file is generated by the server by marking information in the information importing file that does not pass the verification.

According to a third aspect of the one or more embodiments of this specification, an information importing apparatus is provided, including: a receiving unit, configured to enable a server to receive an information importing file uploaded by a user, where the information importing file includes information to be imported into a system; a verification unit, configured to enable the server to verify the information included in the information importing file; a marking unit, configured to enable the server to mark information in the information importing file that does not pass the verification, so as to generate an error comparison file; and a returning unit, configured to enable the server to return the error comparison file to the user.

According to a fourth aspect of the one or more embodiments of this specification, an information importing apparatus is provided, including: an uploading unit, configured to enable a terminal to upload an information importing file to a server, for the server to verify information included in the information importing file and import the information into a system; and a receiving unit, configured to enable the terminal to receive an error comparison file returned by the server, where the error comparison file is generated by the server by marking information in the information importing file that does not pass the verification.

According to a fifth aspect of the one or more embodiments of this specification, an electronic device is provided, including: a processor; and a memory configured to store instructions executable by the processor, where the processor is configured to execute the executable instructions to implement the method according to the first aspect.

According to a sixth aspect of the one or more embodiments of this specification, a computer-readable storage medium is provided, storing computer instructions, where the instructions are executed by a processor to implement steps in the method according to the first aspect.

According to a seventh aspect of the one or more embodiments of this specification, an electronic device is provided, including: a processor; and a memory configured to store instructions executable by the processor, where the processor is configured to execute the executable instructions to implement the method according to the second aspect.

According to an eighth aspect of the one or more embodiments of this specification, a computer-readable storage medium is provided, storing computer instructions, where the instructions are executed by a processor to implement steps in the method according to the second aspect.

BRIEF DESCRIPTION OF THE DRAWINGS

FIG. 5 is a display diagram of an information importing file, according to an exemplary embodiment.

FIG. 7 is a schematic diagram of an importing result page, according to an exemplary embodiment.

FIG. 8 is a schematic diagram of displaying problematic information, according to an exemplary embodiment.

FIG. 9 is a schematic diagram of displaying an error description offline, according to an exemplary embodiment.

FIG. 10 is a schematic diagram of quickly displaying an error description in an offline environment, according to an exemplary embodiment.

FIG. 11 is a schematic diagram of editing file content online, according to an exemplary embodiment.

FIG. 12 is a schematic diagram of displaying error prompt information during online editing, according to an exemplary embodiment.

FIG. 13a is another schematic diagram of displaying error prompt information during online editing, according to an exemplary embodiment.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments are not all the implementations consistent with one or more embodiments of this specification, but are instead only examples of methods and apparatuses that are described in detail in the appended claims and that are consistent with some aspects of one or more embodiments of this specification.

It should be noted that in other embodiments, the steps of corresponding methods are not necessarily performed according to a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

Figure 1:
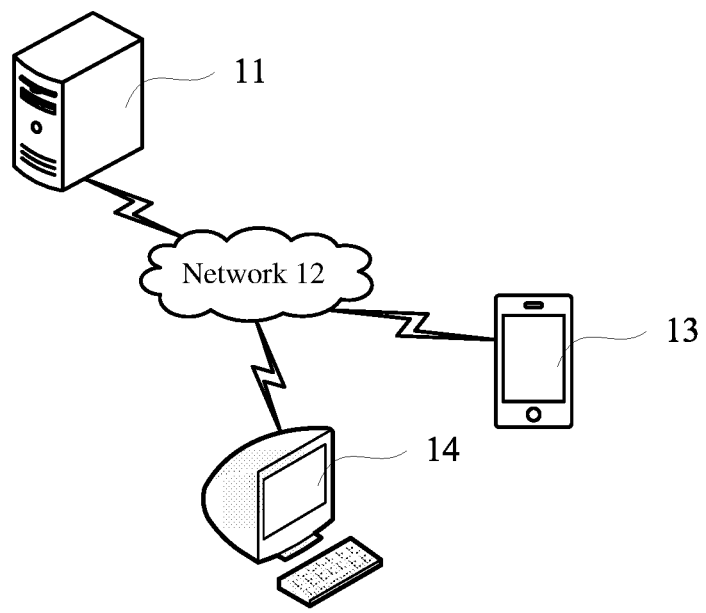
FIG. 1 is a schematic architectural diagram of an information importing system, according to an exemplary embodiment.

FIG. 1 is a schematic architectural diagram of an information importing system, according to an exemplary embodiment. As shown in FIG. 1, the system may include a server 11, a network 12, and several electronic devices such as a mobile phone 13, and a personal computer (PC) 14.

The server 11 may be a physical server including an independent host. Alternatively, the server 11 may be a virtual server carried by a host cluster. During running, the server 11 may run a program on a server side of an application, to achieve related service functions of the application. For example, when the server 11 runs a program of a group office platform, the server may be implemented as a server end of the group office platform. In technical solutions of the one or more embodiments of this specification, the server 11 may cooperate with clients running on the mobile phone 13 and the PC 14 to implement an information importing solution.

In this embodiment, the group office platform may not only implement a communication function, and may be used as an integrated function platform of many other functions, for example, processing of an internal event of a group such as an examination and approval event (for example, examination and approval events such as asking off, applying for office supplies, and financial affairs), an attendance checking event, a task event, or a log event, or processing of an external event of the group such as ordering food or purchasing, which is not limited in one or more embodiments of this specification. The group office platform may support a mobile group office scenario, to enable users to use mobile electronic devices such as the mobile phone 13 to implement related matters of group office. The group office platform may also be compatible with non-mobile electronic devices such as the PC 14 to implement the related matters of group office. In this case, the group office platform may be referred to as a mobile group office platform. For example, the mobile group office platform may be carried on an instant messaging application in related technologies, for example, an enterprise instant messaging (EIM) application. The instant messaging function is merely one of the communication functions supported by the mobile group office platform, and the mobile group office platform may further implement many other functions described above, which are not repeatedly described herein.

Both the mobile phone 13 and the PC 14 are some types of electronic devices that may be used by users. Actually, the users may alternatively use the following types of electronic devices obviously: a tablet device, a notebook computer, a personal digital assistant (PDA), a wearable device (such as smart glasses or a smartwatch), and the like. This is not limited in one or more embodiments of this specification. During running, the electronic device may run a program on a client side of an application, to achieve related service functions of the application. For example, when the electronic device runs a program of a group office platform, the electronic device may be implemented as a client of the group office platform. It should be noted that an application of a client of the group office platform may be pre-installed on the electronic device, and then the client may start and run on the electronic device. When an online "client" of a technology such as HTML5 is used, the client may be obtained and run without installing a corresponding application on the electronic device.

The network 12 through which the mobile phone 13, the PC 14, and the server 11 interact with each other may include a plurality of types of wired or wireless networks. In an embodiment, the network 12 may include a public switched telephone network (PSTN) and the Internet.

Figure 2:
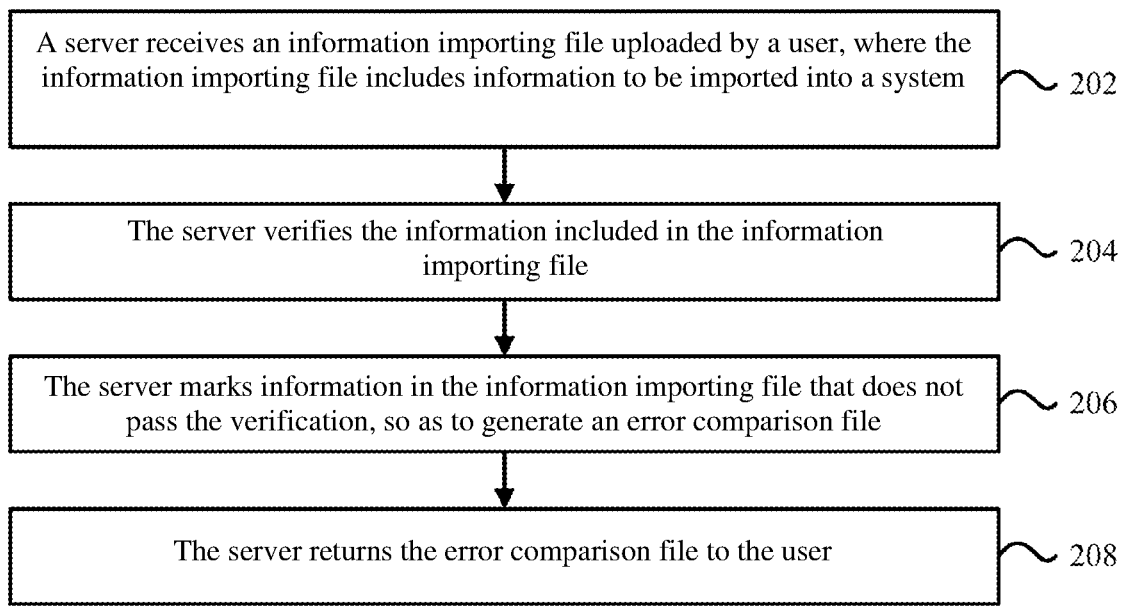
FIG. 2 is a flowchart of an information importing method on a server side, according to an exemplary embodiment.

FIG. 2 is a flowchart of an information importing method on a server side, according to an exemplary embodiment. As shown in FIG. 2, the method is applicable to a server, and may include the following steps:

Step 202: A server receives an information importing file uploaded by a user, where the information importing file includes information to be imported into a system.

In an embodiment, the server may provide a web page access service, for the user to open an access page of the server by accessing a domain name of the server on a browser of a terminal, upload the information importing file based on the access page, and perform other operations.

In an embodiment, a program on a server side of an application runs on the server, for the server to be configured as a server end of the application; and a program on a client side of the application runs on the terminal, for the terminal to be configured as a client of the application. For example, the application may be the foregoing group office platform. The user may upload the information importing file and perform other operations by using the client.

In an embodiment, the information importing file may include one or more pieces of information. Based on a batch import function of the server, after generating the information importing file on the terminal or another device, the user may upload the information importing file to the server, for the server to import the information into the system in batches, and the user does not need to perform importing piece by piece.

In an embodiment, the information importing file may include a plurality of pieces of information in the same format to be imported into the system in batches. For example, the information importing file may include a spreadsheet file. The spreadsheet file is provided with several headers, and each piece of information includes fields corresponding to the headers respectively and values of the fields. For example, when the information included in the information importing file is profile information of personnel in an enterprise, the headers may include name, gender, job number, identity card number, and the like, and each of the enterprise personnel corresponds to one piece of information. The information includes "Zhang San, Male, 0001, 110 . . . ," which indicates that a value of "name" is "Zhang San," a value of "gender" is "Male," a value of "job number" is "0001," a value of "identity card number" is "110 . . . ," and so on. The information importing file may not necessarily be a spreadsheet file, and file types that can clearly indicate information content may all be used, which is not limited in this specification.

In an embodiment, the information importing file may be uploaded to the server by the user by using a terminal. The user may be a creator of the information importing file, or the user may obtain the information importing file from another user, which is not limited in this specification. The information included in the information importing file may be sorted out by the creator based on collected data; or users respectively generate information corresponding to the users and send the information to the creator, and the creator combines the received information into an information importing file without a need to actively collect and sort each piece of information, which is not limited in this specification.

In an embodiment, the information importing file uploaded from the terminal to the server is an electronic document, and the electronic document may be generated from an entity document (for example, a paper document). For example, the terminal performs image acquisition and optical character recognition (OCR) on the entity document, so as to transform the entity document into the electronic document.

Step 204: The server verifies the information included in the information importing file.

In an embodiment, the server may verify the information included in the information importing file by using a predefined verification condition. The verification condition may include a default condition provided by the foregoing application; or the verification condition may further include a condition customized by the user. For example, in an enterprise scenario, the user may be an enterprise administrator, and may customize a verification condition according to an actual requirement of the enterprise.

In an embodiment, the predefined verification condition may be used for verifying the information included in the information importing file from one or more dimensions. For example, the predefined verification condition may be used for verification from an information dimension, for example, whether a quantity of pieces of the information included in the information importing file is excessively small or excessively large. In another example, the predefined verification condition may be used for verification from a content dimension, for example, whether fields included in each piece of information are fields used as required, or whether the same field included in different information has duplicate values.

Step 206: The server marks information in the information importing file that does not pass the verification, so as to generate an error comparison file.

In an embodiment, compared with listing problems or errors to the user separately, by directly marking the information that does not pass the verification in the information importing file to generate the error comparison file in the technical solution of this specification, the information that does not pass the verification can be quickly located based on the error comparison file, thereby helping improve efficiency of finding and correcting errors.

In an embodiment, the server may adjust a display attribute of the information that does not pass the verification, to distinguish the information that does not pass the verification from information that passes the verification. The display attribute may include at least one of the following: a background color, a border color, a character color, a font, a character size, and the like, which is not limited in this specification.

In an embodiment, when each piece of information included in the information importing file includes a plurality of fields, the server may mark a problematic field in the information that does not pass the verification, so that the user does not need to recognize a field or fields having problems in the information autonomously, and can accurately modify the problematic fields, thereby helping improve efficiency of finding and correcting errors.

Step 208: The server returns the error comparison file to the user.

In an embodiment, the server may actively push the error comparison file to the user; or the server may provide a download page for the error comparison file to the user, so that the user may download the error comparison file according to a requirement; or the server may provide an online viewing page or an online editing page for the error comparison file to the user, so that the user may view or modify the error comparison file online.

In an embodiment, in addition to marking the information that does not pass the verification, the server may further add error description information to the error comparison file. The error description information may include each problem (a problem existing in the information importing file or all problems summarized in advance that may occur and not necessarily exist in the information importing file) existing in the information that does not pass the verification, a marking form (for example, which background color is used) corresponding to each problem, a solution to each problem, and the like. By adding the error description information to the error comparison file, especially in a case that the user downloads the error comparison file and performs offline modification, the user can conveniently learn about a problem and a solution to the problem, and does not need to query the server for the problem existing in the marked information or the solution to be used, thereby preventing the user from performing frequent switching between online and offline, and helping simplify user operations and improve operation efficiency of the user.

In an embodiment, the server may separately add the error description information to the error comparison file. That is, the error description information and the originally included information are separated from each other. For example, when the information importing file is an Excel spreadsheet file, the originally included information may be in one sheet of the Excel spreadsheet file, and the error description information may be in another sheet of the Excel spreadsheet file. Alternatively, the server may add the error description information as a remark corresponding to the information that does not pass the verification or the problematic field thereof, so that in a process in which the user views the error comparison file, by triggering the information that does not pass the verification or the problematic field thereof, corresponding error description information (all the error description information or error description information for triggered information or field) may be temporarily shown, so that the user can quickly learn about a problem and a solution to the problem without repeatedly switching between a plurality of sheets.

In an embodiment, the server may feed statistical data back to the user. The statistical data may include at least one of the following: a quantity of pieces of information that is successfully imported into the system, a quantity of pieces of information in the imported information that does not pass the verification, a quantity of pieces of information that does not pass the verification and that is not imported, each problem existing in the information that does not pass the verification, a marking form corresponding to each problem, a solution to each problem, and the like, which is not limited in this specification. For example, in response to an operation of uploading the information importing file to the server by the user, the server may return an importing result page to the user, and display the statistical data in the importing result page for the user the view. The user may modify the information that does not pass the verification or the problematic field in the error comparison file by viewing the statistical data.

In an embodiment, the server may receive an online viewing request initiated by the user, and return a display page of the error comparison file to the user. In addition, the server may determine information selected in the display page by the user, and if the selected information does not pass the verification, update the display page to include error description information for the selected information. Based on this embodiment, when the user selects information or a field included in the information in the display page, corresponding error description information may be automatically updated and displayed in the display page, so that the user quickly learns about a problem existing in the selected information or the field thereof, a solution, and the like.

In an embodiment, the server may receive an online editing request initiated by the user, and edit information in the error comparison file according to the online editing request. For example, the user views the error comparison file in the display page based on the foregoing online viewing request, then the user may further initiate an online editing request for information or a field in the display page during viewing, so as to modify the related information or field. In another example, the user may view the error comparison file in another manner, for example, download the error comparison file for offline viewing; and the user may also initiate an online editing request to the server, to edit the information in the error comparison file.

In an embodiment, the server may receive an online correction request initiated by an information provider. The online correction request is initiated by the information provider based on a correction invitation sent by the user, and the information provider provides related information to the user, or provides related information to another user and the another user forwards the related information to the user. The related information is at least a part of information included in the information importing file. Subsequently, the server may provide an online correction interface to the information provider. The online correction interface includes related information in the information importing file that corresponds to the information provider, for the information provider to perform correction. Because the information provider provides the related information at the early stage, the information provider is more familiar with correct content of the related information than the user, or learns about the correct content of the related information more conveniently than the user. Therefore, after the user sends the correction invitation to the information provider, the information provider may directly participate in a correction operation for the related information based on the correction invitation, which can not only improve a correction speed, but also can reduce a risk of erroneously conveying correction content by the user compared with informing the user of the correction content and performing correction by the user, thereby avoiding repeated modification for the related information.

In an embodiment, in a process in which the information provider corrects the related information by using the online correction interface, the online correction interface displayed to the information provider may only include related information corresponding to the information provider, to prevent the information provider from accessing to other information irrelevant to the information provider, thereby avoiding a leakage of sensitive content included in the other information. The related information corresponding to the information provider may include: all information provided by the information provider, or a problematic field in the information provided by the information provider.

In an embodiment, for the information in the information importing file that does not pass the verification, especially for information with correct content and a wrong format, the server may automatically correct the information that does not pass the verification based on a corresponding verification rule (where the verification rule may be used for representing a correct format of the corresponding information), and return the corrected information (for example, add the corrected information to the error comparison file, or separately send the corrected information) to the user. Correspondingly, when the user confirms that the corrected information provided by the server is correct, the corrected information may be used for replacing corresponding information that does not pass the verification without manual modification by the user. If the user disagrees with the corrected information, the user may still actively perform modification.

In an embodiment, the server may recognize error-prone information included in the information importing file. For example, the server may collect statistics on information types going wrong in importing processes in history, to use a preset quantity (for example, the first three) of information types with cumulative error counts ranked in the top as error-prone information, or use information types with cumulative error counts reaching a preset quantity as error-prone information. In brief, even if the error-prone information passes verification, the server may still mark the error-prone information in the error comparison file, to remind the user to confirm the error-prone information twice or more.

In an embodiment, imported information in the information importing file may have a dynamic value. That is, a value of corresponding information may change dynamically. After completing an importing operation for the corresponding information, the server may obtain the latest value of the information from the terminal (or an information source) in real time or periodically, to ensure that the server can always maintain the latest value of the information.

Figure 3:
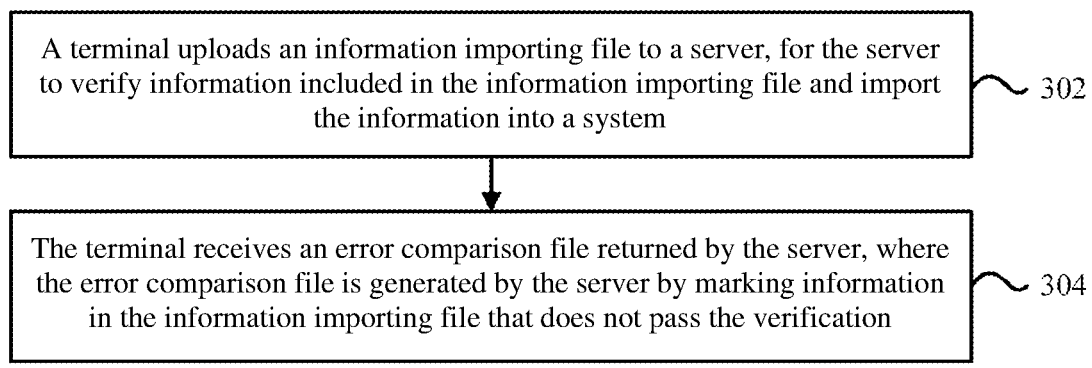
FIG. 3 is a flowchart of an information importing method on a terminal side, according to an exemplary embodiment.

FIG. 3 is a flowchart of an information importing method on a terminal side, according to an exemplary embodiment. As shown in FIG. 3, the method is applicable to a terminal, and may include the following steps:

Step 302: A terminal uploads an information importing file to a server, for the server to verify information included in the information importing file and import the information into a system.

In an embodiment, the server may provide a web page access service, for the user to open an access page of the server by accessing a domain name of the server on a browser of a terminal, upload the information importing file based on the access page, and perform other operations.

In an embodiment, a program on a server side of an application runs on the server, for the server to be configured as a server end of the application; and a program on a client side of the application runs on the terminal, for the terminal to be configured as a client of the application. For example, the application may be the foregoing group office application. The user may upload the information importing file and perform other operations by using the client.

In an embodiment, the information importing file may include one or more pieces of information. Based on a batch import function of the server, after generating the information importing file on the terminal or another device, the user may upload the information importing file to the server by using the terminal, for the server to import the information into the system in batches, and the user does not need to perform importing piece by piece.

In an embodiment, the information importing file may include a plurality of pieces of information in the same format to be imported into the system in batches. For example, the information importing file may include a spreadsheet file. The spreadsheet file is provided with several headers, and each piece of information includes fields corresponding to the headers respectively and values of the fields. For example, when the information included in the information importing file is profile information of personnel in an enterprise, the headers may include name, gender, job number, identity card number, and the like, and each of the enterprise personnel corresponds to one piece of information. The information includes "Zhang San, Male, 0001, 110 . . . ," which indicates that a value of "name" is "Zhang San," a value of "gender" is "Male," a value of "job number" is "0001," a value of "identity card number" is "110 . . . ,"

and so on. The information importing file may not necessarily be a spreadsheet file, and file types that can clearly indicate information content may all be used, which is not limited in this specification.

In an embodiment, the information importing file may be uploaded to the server by the user by using a terminal. The user may be a creator of the information importing file, or the user may obtain the information importing file from another user, which is not limited in this specification. The information included in the information importing file may be sorted out by the creator based on collected data; or users respectively generate information corresponding to the users and send the information to the creator, and the creator combines the received information into an information importing file without a need to actively collect and sort each piece of information, which is not limited in this specification.

In an embodiment, the information importing file uploaded from the terminal to the server is an electronic document, and the electronic document may be generated from an entity document (for example, a paper document). For example, the terminal performs image acquisition and OCR on the entity document, so as to transform the entity document into the electronic document.

In an embodiment, the predefined verification condition may be used by the server to verify the information included in the information importing file. The verification condition may include a default condition provided by the foregoing application; or the verification condition may further include a condition customized by the user. For example, in an enterprise scenario, the user may be an enterprise administrator, and may customize a verification condition according to an actual requirement of the enterprise.

In an embodiment, the predefined verification condition may be used for verifying the information included in the information importing file from one or more dimensions. For example, the predefined verification condition may be used for verification from an information dimension, for example, whether a quantity of pieces of the information included in the information importing file is excessively small or excessively large. In another example, the predefined verification condition may be used for verification from a content dimension, for example, whether fields included in each piece of information are fields used as required, or whether the same field included in different information has duplicate values.

Step 304: The terminal receives an error comparison file returned by the server, where the error comparison file is generated by the server by marking information in the information importing file that does not pass the verification.

In an embodiment, compared with listing problems or errors to the user separately, by directly marking the information that does not pass the verification in the information importing file to generate the error comparison file in the technical solution of this specification, the information that does not pass the verification can be quickly located based on the error comparison file, thereby helping improve efficiency of finding and correcting errors.

In an embodiment, a display attribute of the information that does not pass the verification may be adjusted by the server, to distinguish the information that does not pass the verification from information that passes the verification. The display attribute may include at least one of the following: a background color, a border color, a character color, a font, a character size, and the like, which is not limited in this specification.

In an embodiment, when each piece of information included in the information importing file includes a plurality of fields, a problematic field in the information that does not pass the verification may be marked by the server, so that the user does not need to recognize a field or fields having problems in the information autonomously, and can accurately modify the problematic fields, thereby helping improve efficiency of finding and correcting errors.

In an embodiment, the server may actively push the error comparison file to the user; or the server may provide a download page for the error comparison file to the user, so that the user may download the error comparison file according to a requirement; or the server may provide an online viewing page or an online editing page for the error comparison file to the user, so that the user may view or modify the error comparison file online.

In an embodiment, in addition to marking the information that does not pass the verification, the error comparison file may further include error description information added by the server. The error description information may include each problem (a problem existing in the information importing file or all problems summarized in advance that may occur and not necessarily exist in the information importing file) existing in the information that does not pass the verification, a marking form (for example, which background color is used) corresponding to each problem, a solution to each problem, and the like. By adding the error description information to the error comparison file, especially in a case that the user downloads the error comparison file and performs offline modification, the user can conveniently learn about a problem and a solution to the problem, and does not need to query the server for the problem existing in the marked information or the solution to be used, thereby preventing the user from performing frequent switching between online and offline, and helping simplify user operations and improve operation efficiency of the user.

In an embodiment, the error comparison file may include the error description information separately added by the server. That is, the error description information and the originally included information are separated from each other. For example, when the information importing file is an Excel spreadsheet file, the originally included information may be in one sheet of the Excel spreadsheet file, and the error description information may be in another sheet of the Excel spreadsheet file. Alternatively, the error description information may be added by the server as a remark corresponding to the information that does not pass the verification or the problematic field thereof, so that in a process in which the user views the error comparison file, by triggering the information that does not pass the verification or the problematic field thereof, corresponding error description information (all the error description information or error description information for triggered information or field) may be temporarily shown, so that the user can quickly learn about a problem and a solution to the problem without repeatedly switching between a plurality of sheets.

In an embodiment, the terminal may receive and display statistical data fed back by the server. The statistical data may include at least one of the following: a quantity of pieces of information that is successfully imported into the system, a quantity of pieces of information in the imported information that does not pass the verification, a quantity of pieces of information that does not pass the verification and that is not imported, each problem existing in the information that does not pass the verification, a marking form corresponding to each problem, a solution to each problem, and the like, which is not limited in this specification. For example, in response to an operation of uploading the information importing file to the server by the user, the server may return an importing result page to the user, and display the statistical data in the importing result page for the user the view. The user may modify the information that does not pass the verification or the problematic field in the error comparison file by viewing the statistical data.

In an embodiment, the user may initiate an online viewing request to the server by using the terminal, and receive a display page of the error comparison file returned by the server. In addition, the terminal may inform the server of information selected in the display page by the user, and if the selected information does not pass the verification, update the display page according to page data returned by the server to include error description information for the selected information. Based on this embodiment, when the user selects information or a field included in the information in the display page, corresponding error description information may be automatically updated and displayed in the display page, so that the user quickly learns about a problem existing in the selected information or the field thereof, a solution, and the like.

In an embodiment, the terminal may initiate an online editing request to the server, for the server to edit information in the error comparison file according to the online editing request. For example, the user views the error comparison file in the display page based on the foregoing online viewing request, then the user may further initiate an online editing request for information or a field in the display page during viewing, so as to modify the related information or field. In another example, the user may view the error comparison file in another manner, for example, download the error comparison file for offline viewing; and the user may also initiate an online editing request to the server, to edit the information in the error comparison file.

In an embodiment, the terminal may initiate a correction invitation to an information provider corresponding to the information in the information importing file that does not pass the verification, for the information provider to perform correction. The information provider provides related information to the user, or provides related information to another user and the another user forwards the related information to the user. The related information is at least a part of information included in the information importing file. Because the information provider provides the related information at the early stage, the information provider is more familiar with correct content of the related information than the user, or learns about the correct content of the related information more conveniently than the user. Therefore, after the user sends the correction invitation to the information provider, the information provider may directly participate in a correction operation for the related information based on the correction invitation, which can not only improve a correction speed, but also can reduce a risk of erroneously conveying correction content by the user compared with informing the user of the correction content and performing correction by the user, thereby avoiding repeated modification for the related information.

In an embodiment, the correction invitation is used for instructing the information provider to initiate an online correction request to the server, for the information provider to perform correction by using an online correction interface provided by the server. For example, the information provider may initiate an online correction request to the server by triggering the correction invitation, and the server may return online correction page data to the information provider, so that an electronic device used by the information provider may display a corresponding online correction interface based on the online correction page data, and correct related information based on the online correction interface. In a process in which the information provider corrects the related information by using the online correction interface, the online correction interface displayed to the information provider may only include related information corresponding to the information provider, to prevent the information provider from accessing to other information irrelevant to the information provider, thereby avoiding a leakage of sensitive content included in the other information. The related information corresponding to the information provider may include: all information provided by the information provider, or a problematic field in the information provided by the information provider.

In an embodiment, the correction request is used for instructing the information provider to return corrected information corresponding to the information in the information importing file that does not pass the verification. Correspondingly, the terminal may edit the information importing file or the error comparison file according to the corrected information; or the terminal may initiate an online editing request to the server according to the corrected information, to perform editing by using an online editing interface provided by the server. In other words, in this case, the information provider does not directly perform a correct operation, but provides the corrected information to the user, for the user to edit and modify the related information based on the corrected information.

In an embodiment, for the information in the information importing file that does not pass the verification, especially for information with correct content and a wrong format, the server may automatically correct the information that does not pass the verification based on a corresponding verification rule (where the verification rule may be used for representing a correct format of the corresponding information), and return the corrected information (for example, add the corrected information to the error comparison file, or separately send the corrected information) to the user. Correspondingly, the terminal may receive the corrected information and display the corrected information to the user, and when the user confirms that the corrected information provided by the server is correct, the terminal may use the corrected information to replace corresponding information that does not pass the verification without manual modification by the user. If the user disagrees with the corrected information, the user may still actively perform modification.

In an embodiment, the server may recognize error-prone information included in the information importing file. For example, the server may collect statistics on information types going wrong in importing processes in history, to use a preset quantity (for example, the first three) of information types with cumulative error counts ranked in the top as error-prone information, or use information types with cumulative error counts reaching a preset quantity as error-prone information. In brief, even if the error-prone information passes verification, the server may still mark the error-prone information in the error comparison file. Correspondingly, when displaying the error comparison file to the user, the terminal may display the marked error-prone information, to remind the user to confirm the error-prone information twice or more.

In an embodiment, imported information in the information importing file may have a dynamic value. That is, a value of corresponding information may change dynamically. Therefore, after completing an importing operation for the corresponding information, the terminal may provide the latest value of the information to the server in real time or periodically, to ensure that the server can always maintain the latest value of the information. If an information source of the information is not the terminal, the server may alternatively obtain the latest value of the information from the information source of the information without information transfer by the terminal.

The technical solution of this specification is described below by using an application T as an example with reference to a personnel information maintenance scenario in an enterprise.

Figure 4:
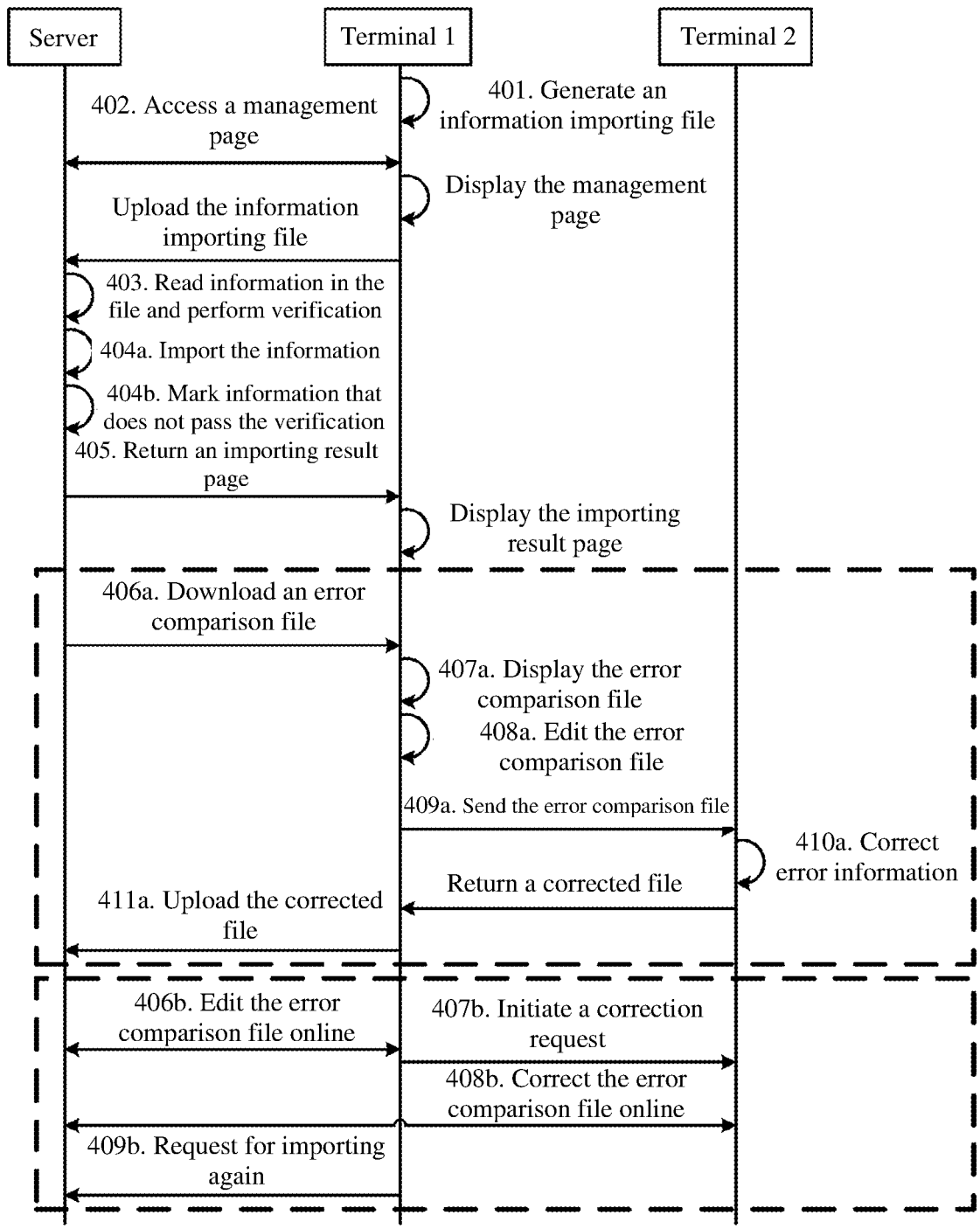
FIG. 4 is a schematic interaction diagram of performing information maintenance for enterprise personnel, according to an exemplary embodiment.

FIG. 4 is a schematic interaction diagram of performing information maintenance for enterprise personnel, according to an exemplary embodiment. As shown in FIG. 4, the interaction process relates to a server, a terminal 1, and a terminal 2. The terminal 1 belongs to a user Ua, the terminal 2 belongs to a user Ub, the user Ua is an administrator in the enterprise, and the user Ub is an ordinary person in the enterprise. It is assumed that a program on a server side of the application T runs on the server, that is, the server is configured as a server end of the application T. A program on a terminal side of the application T runs on each of the terminal 1 and the terminal 2, an account of the user Ua logs in to the terminal 1, and an account of the user Ub logs in to the terminal 2, so that the terminal 1 is configured as a client 1 corresponding to the user Ua, and the terminal 2 is configured as a client 2 corresponding to the user Ub. An interaction process between the server, the terminal 1, and the terminal 2 may include the following steps:

Step 401: The terminal 1 generates an information importing file.

In an embodiment, the information importing file includes profile information of all personnel or newly-added personnel in the enterprise. The profile information included in the information importing file may be obtained from statistical arrangement for paper files by the user Ua, or each of the enterprise personnel provides profile information thereof to the user Ua. For example, the user Ub may provide profile information of the user Ub to the user Ua by using the terminal 2. Similarly, other enterprise personnel may also provide profile information thereof to the user Ua, and the user Ua may generate the information importing file by using the terminal 1.

In an embodiment, the profile information may be organized in a form of a spreadsheet file in the information importing file. For example, FIG. 5 is a display diagram of an information importing file, according to an exemplary embodiment. As shown in FIG. 5, a display interface 50 may include a spreadsheet tab 510 named "employee data," and the spreadsheet tab 510 includes profile information of all personnel in the enterprise. The spreadsheet tab 510 includes a plurality of headers, such as "User ID," "Name," "Mobile phone number," "Job number," "Identity card address," and "Birth date," and each piece of profile information includes values respectively corresponding to the headers. For example, in profile information corresponding to one of the enterprise personnel, a value of User ID is 132456416, a value of Name is Liu Yi, a value of Mobile phone number is 186****1234, a value of Job number is 000001, a value of Identity card address is Hangzhou, and a value of Birth date is 1985/11/12, which corresponds to the first piece of profile information in the spreadsheet tab 510. The situations of other profile information are similar, and are not listed herein one by one. It is to be noted that: in addition to the profile information of the enterprise personnel, the headers also belong to information included in the information importing file, and the headers are verified and modified in subsequent steps.

Step 402: The terminal 1 accesses and displays a management page for the server, and uploads the information importing file to the server based on the display page.

Figure 6:
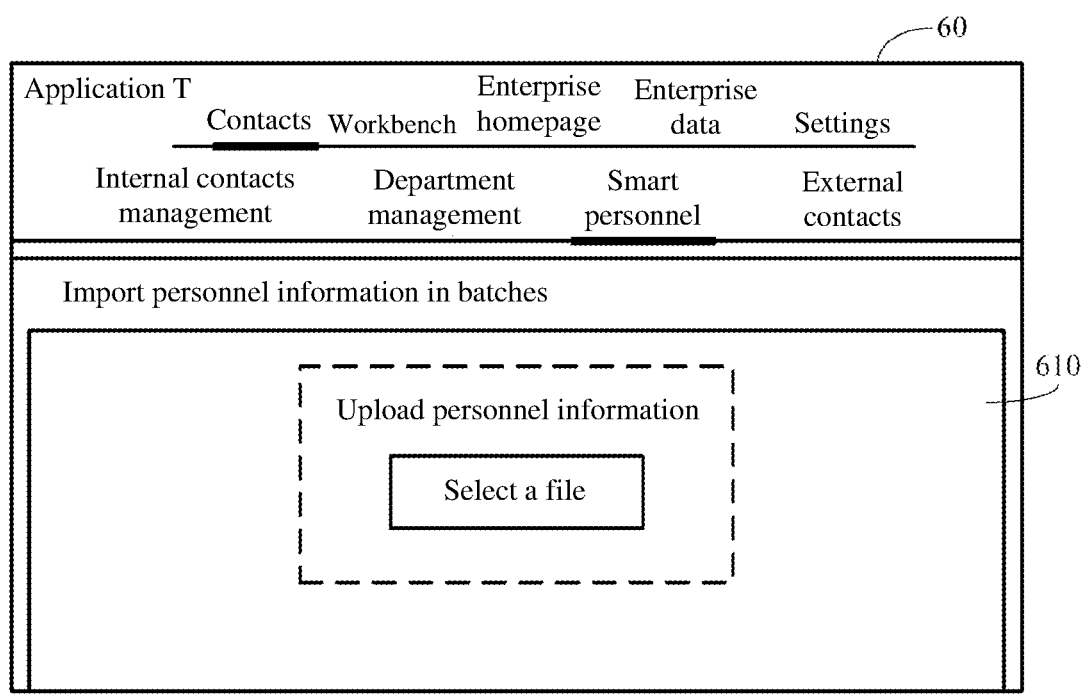
FIG. 6 is a schematic diagram of a management page, according to an exemplary embodiment.

In an embodiment, the terminal 1 may access and display the management page by entering an accessing domain name of the server by using a browser. For example, FIG. 6 is a schematic diagram of a management page, according to an exemplary embodiment. As shown in FIG. 6, a management page 60 displayed on the terminal 1 may include several levels of label options, where first-level label options include "Contacts," "Workbench," "Enterprise homepage," "Enterprise data," "Settings," and the like. After the user Ua selects the label option "Contacts", second-level label options such as "Internal contacts management," "Department management," "Smart personnel," and "External contacts" can be invoked. Based on the label option "Smart personnel" selected by the user Ua, a corresponding label page 610 can be shown in the management page 60, so as to implement related functions. Similarly, when the user Ua selects another second-level label option, a corresponding label page can also be invoked. In other embodiments, more levels of label options may be used in the management page 60, or multi-level label options may not be necessarily used, which is not limited in this specification.

Based on the label page 610 shown in FIG. 6, the user Ua may trigger a "Select file" button to select an information importing file locally or from a cloud storage space; or the user Ua may drag an information importing file into a dashed line box in the label page 610, so as to upload the information importing file to the server.

Step 403: The server reads information in the file and perform verification.

In an embodiment, the server maintains an information verification rule. The information verification rule is used for verifying the information included in the information importing file, to determine whether each piece of information can be successfully imported, and whether modification needs to be performed.

Step 404*a*: The server imports information.

In an embodiment, according to a verification result for each piece of information in step 403, the server can distinguish information that passes the verification and information that does not pass the verification. The server may directly import the information that passes the verification; and for the information that does not pass the verification, if an information verification rule that the information fails to satisfy is a non-critical rule, the server may still import the corresponding information, provided that a problematic field is modified subsequently. However, if the information verification rule that the information fails to satisfy is a critical rule, the server refuses to import the corresponding information.

Step 404*b*: The server marks information that does not pass the verification.

In an embodiment, for the information that does not pass the verification, the server may directly mark corresponding information in the information importing file, to intuitively show that the information does not pass the verification, and may even represent a problem existing in each piece of information through a difference between marking manners.

Step 405: The server returns an importing result page to the terminal 1, for the terminal 1 to display the importing result page.

In an embodiment, the importing result page includes an importing result of the server for the information importing file. For example, FIG. 7 is a schematic diagram of an importing result page, according to an exemplary embodiment. After an importing operation is completed, the label page 610 included in the management page 60 may be switched into an importing result page 620 shown in FIG. 7, for the user Ua to quickly learn about the situation of the current importing.

As shown in FIG. 7, the importing result page 620 may include summary information and detailed information. The summary information includes "Import profile information of 300 personnel: profile information of 283 personnel is successfully imported/there are problems in some content of 128 personnel, and profile information of 17 personnel fails to be imported," which indicates that the information importing file includes profile information of 300 enterprise personnel, and there are problems in 128 pieces of profile information in the 283 pieces of imported profile information. That is, the 128 pieces of profile information do not satisfy the non-critical rule, the other 155 pieces of profile information satisfy all information verification rules, and 17 pieces of profile information do not satisfy the critical rule.

The detailed information is mainly used for providing a detailed description of the 128 pieces of profile information that have been imported but there are problems in some content and the 17 pieces of profile information that fail to be imported. The described content mainly includes two parts of content: problems and solutions. For example, one of reasons for the import failure is "Missing necessary information 'Name'," and a corresponding solution is "Please upload again after adding 'Name'." When the server marks the information that does not pass the verification by modifying a background color, the detailed information may further include a marking color correspondingly used for each problem. For example, the "Missing necessary information 'Name'" is marked in red, and therefore may be correspondingly described as "Having been marked in red in the file" in the importing result page 620. Similarly, when a problem is "The header is not recognized," a specific reason may be pointed out as "The header 'Identity card address' is not recognized." A corresponding solution may be "Please modify to the specified header," and "Having been marked in purple in the file" is marked.

The server may mark problematic profile information in the information importing file based on step 404*b*, to generate a corresponding error comparison file. Based on the error comparison file, there are a plurality of manners of modifying related errors. A description is provided below separately with reference to steps 406*a* to 411*a* and steps 406*b* to 409*b*.

In steps 406*a* to 411*a*, offline modification may be performed for the error comparison file, and a specific process thereof is as follows:

Step 406*a*: The terminal 1 downloads the error comparison file from the server.

In an embodiment, the importing result page 620 shown in FIG. 7 may include a "Download error sheet" button, so that the user Ua may download the error comparison file by triggering the "Download error sheet" button.

Step 407*a*: The terminal 1 displays the error comparison file.

Step 408*a*: The terminal 1 edits the error comparison file.

In an embodiment, the user Ua may perform an edition operation on the terminal 1, and the terminal 1 may edit information included in the error comparison file based on the edition operation, so as to modify the problematic information.

For example, FIG. 8 is a schematic diagram of displaying problematic information, according to an exemplary embodiment. As shown in FIG. 8, the display interface 50 may include the foregoing spreadsheet tab 510 named "Employee data," and problematic cells in the spreadsheet tab 510 have been marked by the server in different colors, so that the user can quickly locate the problematic cells, to perform targeted edition and modification.

The server may generate a spreadsheet tab 510 (first tab) and a spreadsheet tab 520 (second tab) of the error comparison file. The second tab may include a marking form corresponding to the information that does not pass the verification, a problem corresponding to the information that does not pass the verification, and a solution corresponding to the problem. The first tab may include the information of the uploaded file. Further, the server may generate prompt information that is automatically displayable under the first tab when the information that does not pass the verification is triggered. The prompt information may include the problem corresponding to the information that does not pass the verification and the solution corresponding to the problem. Thus, the generated first tab may include the prompt information.

The user Ua may make reference to the importing result page 620 shown in FIG. 7 to determine a problem corresponding to a color marked in the spreadsheet tab 510 and a manner to be used to resolve the corresponding problem. Alternatively, in addition to the spreadsheet tab 510, the display interface 50 may further include a spreadsheet tab 520 named "Error description" shown in FIG. 8. The user Ua may implement a quick switching operation between the spreadsheet tab 510 and the spreadsheet tab 520. For example, FIG. 9 is a schematic diagram of displaying an error description offline, according to an exemplary embodiment. As shown in FIG. 9, the spreadsheet tab 520 may show a problem corresponding to each background color, that is, "an import error description," and a solution provided for each problem, so that even in a completely offline scenario, the user Ua may still quickly modify information in the spreadsheet tab 510 based on the spreadsheet tab 520, instead of having to view the importing result page 620 online.

Further, mutual correlation between the spreadsheet tab 510 corresponding to the employee data and the spreadsheet tab 520 corresponding to the error descriptions may be achieved, so that the user Ua may perform linked display on related error descriptions during an operation for the spreadsheet tab 510. For example, FIG. 10 is a schematic diagram of quickly displaying an error description in an offline environment, according to an exemplary embodiment. As shown in FIG. 10, it is assumed that in a process in which the user Ua browses the spreadsheet tab 510, a cell included in the spreadsheet tab 510 is triggered (touched and selected, clicked by using a mouse, or the like). If there is a problem in content of the cell or information to which the content belongs, corresponding prompt information 511 may be shown. The prompt information 511 may include the corresponding problem and a solution to the problem. For example, when generating the error comparison file, in addition to performing background color modification on problematic cells in the spreadsheet tab 510 to implement marking, the server may further add remark information for the cells, where the remark content is the corresponding problems and solutions to the problems. In this way, the terminal 1 can implement the embodiment shown in FIG. 10 according to this method, and the user Ua does not need to perform repeated switching between the spreadsheet tab 510 and the spreadsheet tab 520.

Step 409a: The terminal 1 sends the error comparison file to the terminal 2.

Step 410a: The terminal 2 corrects error information according to a correct operation performed by the user Ua, and returns a corrected file to the terminal 1.

Step 411a: The terminal 1 uploads the corrected file to the server.

In an embodiment, the user Ua can probably only edit and modify some information, and cannot correct all errors. Therefore, it is assumed that a piece of problematic information is provided by the user Ub, then the user Ua may send the error comparison file to the user Ub, so that the user Ub may correct the information provided by the user Ub. If the user Ua can complete edition and modification for all problems, steps 409a and 410a may be omitted, and the terminal 1 may directly upload a file having been corrected by the user Ua to the server. Similarly, the user Ua may completely perform no modification, and directly send the error comparison file to the user Ub, for the user Ub to perform correction. Alternative to the user Ub, the information included in the error comparison file may be from other users, then the user Ua may separately send the error comparison file to the users, for the users to perform correction. A process thereof is similar to steps 409a and 410a, which is not listed herein one by one.

In an embodiment, the user Ua may upload the corrected file to the server by triggering an "Upload corrected sheet" button included in the importing result page 620 shown in FIG. 7, for the server to perform importing. There may still be information that does not pass the verification in the corrected file, then the foregoing steps may be repeated, until all files pass the verification and are successfully imported.

In steps 406b to 409b, online modification may be performed for the error comparison file, and a specific process thereof is as follows:

Step 406b: The user Ua edits the error comparison file online by using the terminal 1.

In an embodiment, the user Ua may trigger, by using the terminal 1, an "Edit sheet online" button included in the importing result page 620 shown in FIG. 7, to initiate an online editing request to the server. The server may return corresponding page data. The page data is used for displaying an online editing page 630 shown in FIG. 11 on the terminal 1. FIG. 11 is a schematic diagram of editing file content online, according to an exemplary embodiment.

The online editing page 630 shown in FIG. 11 includes displayed content similar to that of the spreadsheet tab 510 shown in FIG. 8, so that the user Ua can clearly view the information included in the error comparison file, especially can quickly distinguish problematic cells (that is, fields or headers included in the information) based on a background color difference. The user Ua may directly edit the content included in the online editing page 630, for example, modify a value of a cell, add content to an empty cell, or delete an existing cell.

FIG. 12 is a schematic diagram of displaying error prompt information during online editing, according to an exemplary embodiment. In a process in which the user Ua performs online editing, when a cell included in the online editing page 630 is triggered, the server may update the online editing page 630, to display an error prompt interface 640 shown in FIG. 12. The error prompt interface 640 may include a cause of an error and a solution. For example, when a selected cell is "Identity card address," a cause of an error may be "The header name is not recognized," and a solution may be "You may select a similar field from the existing fields of the system for matching, or add a new field." In addition, all existing fields (for example, fields such as "Name," "Mailbox," and "Department" that belong to "Basic information," and fields such as "Employee type" and "Employee state" that belong to "Job information") in the system may be displayed to the user Ua for selection, and the user Ua may further search for an existing field by using a search box. Further, the original content "Identity card address" in the cell may be replaced with a field, for example, "Identity card location," selected by the user Ua. If there are no similar fields expressing same meaning, the user Ua may add "Identity card address" as a new field in the system by using an "Add now" button included in the error prompt interface 640.

Similarly, FIG. 13a is another schematic diagram of displaying error prompt information during online editing, according to an exemplary embodiment. As shown in FIG. 13a, when a selected cell is "100****321," a cause of an error may be "The format of the mobile phone number is incorrect," and a solution may be "If it is a foreign mobile phone number, the country code needs to be added."

The server may obtain an edition operation performed by the terminal 1. The obtaining operation may be, for example, real-time. The server may verify the edited content, and update the online editing page 630 according to a verification result, so that the user Ua may view an effect after the edition immediately: If the edited content pass the verification, a background color of the corresponding cell is restored to a default color; otherwise, the background color of the corresponding cell is maintained or adjusted according to a problem of the edited content.

Step 407b: The terminal 1 initiates a correction request to the terminal 2.

Step 408b: The user Ub corrects the error comparison file online by using the terminal 2.

Step 409b: The terminal 1 requests the server for importing again.

In an embodiment, the online editing page 630 shown in FIG. 12 may include an "Invite other administrators to refine" button. The user Ua may send an invitation (that is, a correction request) to another administrator by triggering the button, so that the another administrator may perform online correction for the error comparison file based on the invitation. Reference may be made to the foregoing online editing process of the user Ua, and details are not described herein again.

Figure 13B:
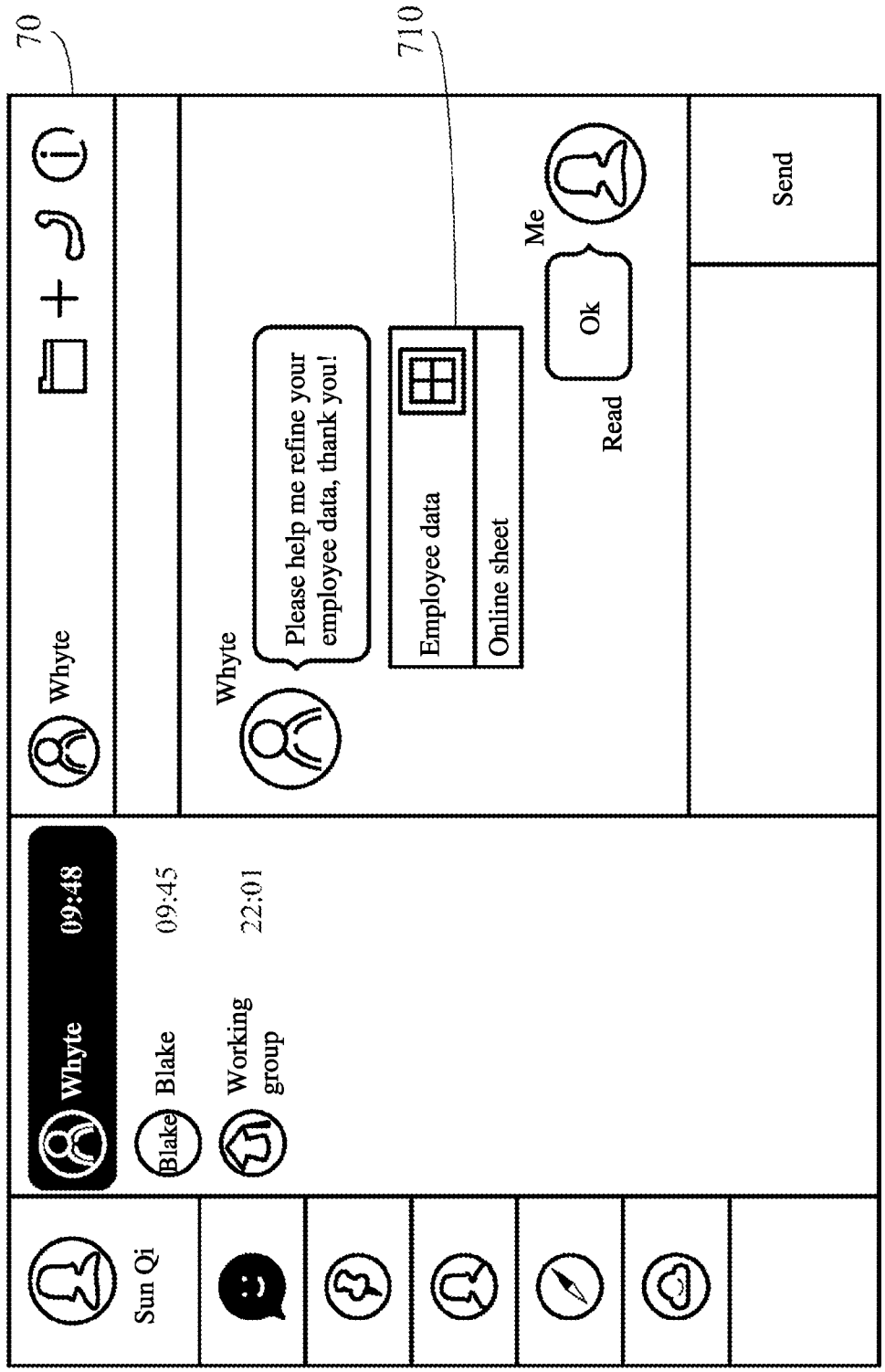
FIG. 13b is a schematic diagram of a communication session interface, according to an exemplary embodiment.

In an embodiment, a cell selected in FIG. 12 is a header, that is, the cell corresponds to all users in the error comparison file, and a cell selected in FIG. 13a corresponds to a user "Sun Qi." Therefore, in the embodiment shown in FIG. 13a, the error prompt interface 640 may show an "Invite 'Sun Qi' to refine" button, so that the user Ua may send an invitation (that is, a correction request) to the user "Sun Qi" by triggering the button. When the user "Sun Qi" is the user Ub, the process is equivalent to that the terminal 1 initiates a correction request to the terminal 2, then the user Ub may receive and view a corresponding invitation message 710 by using, for example, a communication session interface 70 (for example, the user Ua is "Whyte") shown in FIG. 13b. The invitation message 710 may be online editing invitation information, so that the user may enter an online correction interface by triggering the invitation message 710, to perform online correction for the error comparison file. Alternatively, the invitation message 710 may carry the error comparison file or information in the error comparison file that needs to be corrected by the user Ub, for the user Ub to complete correction on the terminal 2 and then return the corrected file or information to the user Ua. Information of the user "Sun Qi" may not necessarily be provided to the user Ua by the user "Sun Qi". In this case, by triggering an "Invite other users to refine" button shown in the error prompt interface 640, the user Ua may independently select a user whom the user Ua would like to invite and initiate a correction request to the user.

Especially in a case that the user Ub is not an administrator, when the server cooperates with the terminal 2 to implement online correction on the error comparison file by the user Ub, the server may only provide information or a cell selected by the user Ua to the user Ub, to avoid providing other information (especially information of other users) to the user Ub, thereby avoiding a leakage of sensitive content.

In addition to importing employee data in an enterprise scenario, the information importing solution of this specification may also be applied to other scenarios, such as importing financial information in a financial scenario, importing asset information in an asset management scenario, and importing group information in a social group scenario, which is not limited in this specification. The social group scenario is used as an example. The technical solution of this specification can help a group leader determine an information missing situation through check of group information, and even automatically correct an existing error, and to help the group leader solve a problem. In addition, for situations such as missing information or incorrect information, the server can push prompt information in the group to instruct group members to complete or correct the corresponding information, and to help the group leader complete an importing operation on related information.

Figure 14:
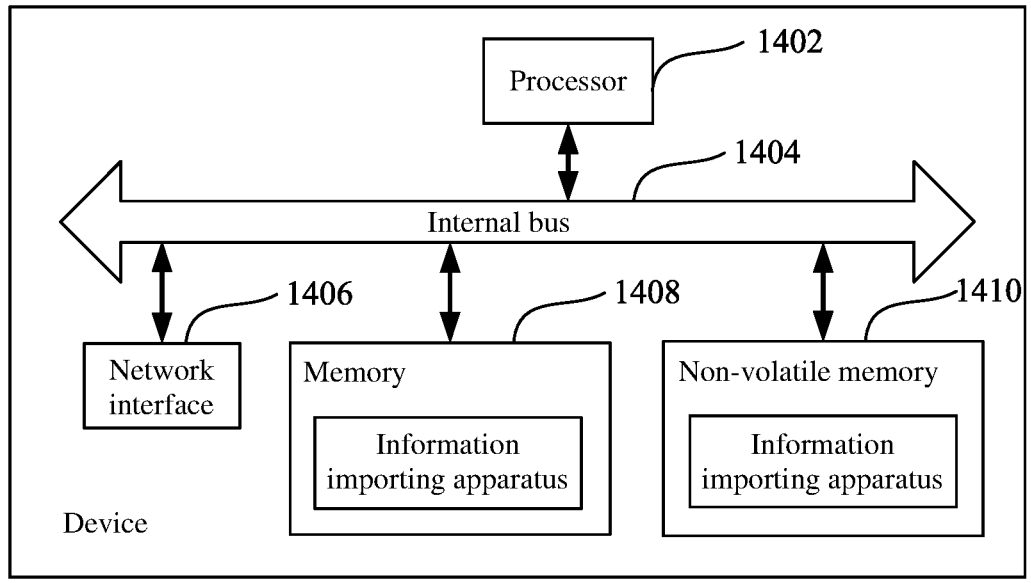
FIG. 14 is a schematic structural diagram of a device on a server side, according to an exemplary embodiment.

FIG. 14 is a schematic structural diagram of a device, according to an exemplary embodiment. Referring to FIG. 14, at a hardware level, the device includes a processor 1402, an internal bus 1404, a network interface 1406, a memory 1408, and a non-volatile memory 1410, and may further include hardware required for other services. The processor 1402 reads a corresponding computer program from the non-volatile memory 1410 into the memory 1408 and then executes the computer program, to form an information importing apparatus at a logic level. In addition to a software implementation, one or more embodiments of this specification do not exclude other implementations, for example, logic devices or a software-hardware combination. That is, execution entities of the following processing procedures are not limited to logic units and may alternatively be hardware or logic devices.

Figure 15:
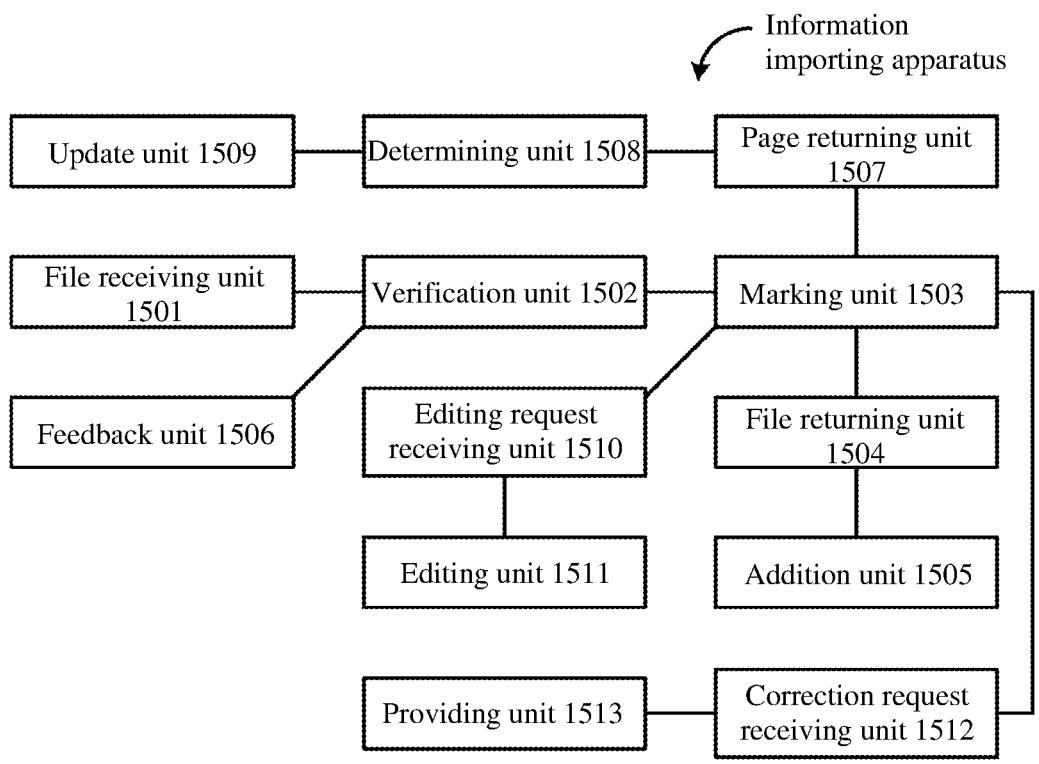
FIG. 15 is a block diagram of an information importing apparatus on a server side, according to an exemplary embodiment.

Referring to FIG. 15, in a software implementation, the information importing apparatus may include: a file receiving unit 1501, configured to enable a server to receive an information importing file uploaded by a user, where the information importing file includes information to be imported into a system; a verification unit 1502, configured to enable the server to verify the information included in the information importing file; a marking unit 1503, configured to enable the server to mark information in the information importing file that does not pass the verification, so as to generate an error comparison file; and a file returning unit 1504, configured to enable the server to return the error comparison file to the user.

Optionally, the information importing file includes a plurality of pieces of information in the same format to be imported into the system in batches.

Optionally, the marking unit 1503 is configured to: enable the server to adjust a display attribute of the information that does not pass the verification, to distinguish the information that does not pass the verification from information that passes the verification.

Optionally, the display attribute includes at least one of the following: a background color, a border color, a character color, a font, and a character size.

Optionally, the marking unit 1503 is configured to: enable the server to mark, when each piece of information included in the information importing file includes a plurality of fields, a problematic field in the information that does not pass the verification.

Optionally, the apparatus further includes: an addition unit 1505, configured to enable the server to add error description information to the error comparison file, where the error description information includes each problem existing in the information that does not pass the verification, a marking form corresponding to each problem, and a solution to each problem.

Optionally, the apparatus further includes: a feedback unit 1506, configured to enable the server to feed statistical data back to the user, where the statistical data includes at least one of the following: a quantity of pieces of information that is successfully imported into the system, a quantity of pieces of information in the imported information that does not pass the verification, a quantity of pieces of information that does not pass the verification and that is not imported, each problem existing in the information that does not pass the verification, a marking form corresponding to each problem, and a solution to each problem.

Optionally, the apparatus further includes: a page returning unit 1507, configured to enable the server to receive an online viewing request initiated by the user, and return a display page of the error comparison file to the user; a determining unit 1508, configured to enable the server to determine information selected in the display page by the user; and an update unit 1509, configured to, if the selected information does not pass the verification, enable the server to update the display page to include error description information for the selected information.

Optionally, the apparatus further includes: an editing request receiving unit 1510, configured to enable the server to receive an online editing request initiated by the user; and an editing unit 1511, configured to enable the server to edit information in the error comparison file according to the online editing request.

Optionally, the apparatus further includes: a correction request receiving unit 1512, configured to enable the server to receive an online correction request initiated by an information provider, where the online correction request is initiated by the information provider based on a correction invitation sent by the user; and a providing unit 1513, configured to enable the server to provide an online correction interface to the information provider, where the online correction interface includes related information in the information importing file that corresponds to the information provider, for the information provider to perform correction.

Optionally, the online correction interface only includes the related information corresponding to the information provider, where the related information corresponding to the information provider includes: all information provided by the information provider, or a problematic field in the information provided by the information provider.

Figure 16:
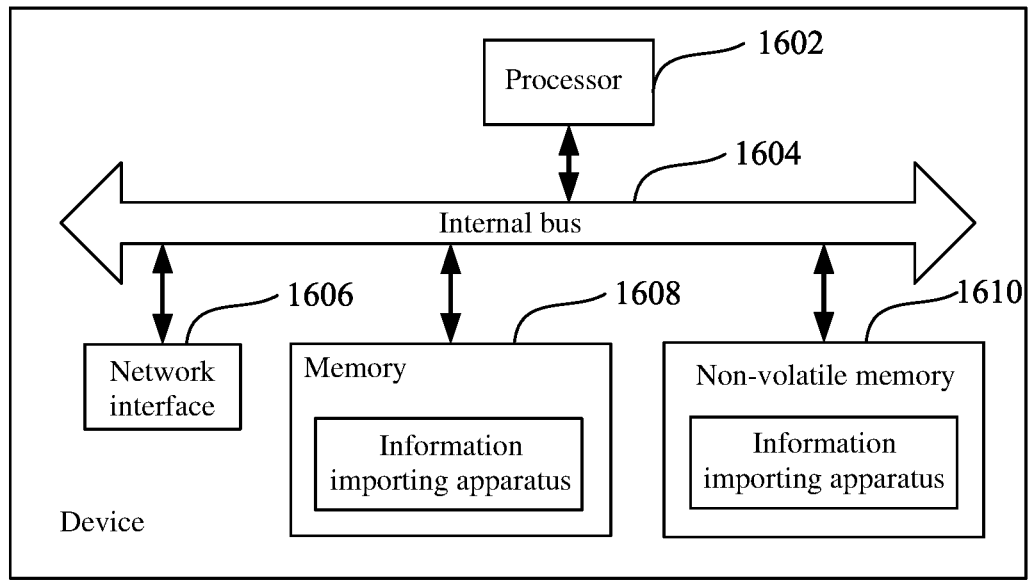
FIG. 16 is a schematic structural diagram of a device on a terminal side, according to an exemplary embodiment.

FIG. 16 is a schematic structural diagram of a device, according to an exemplary embodiment. Referring to FIG. 16, at a hardware level, the device includes a processor 1602, an internal bus 1604, a network interface 1606, a memory 1608, and a non-volatile memory 1610, and may further include hardware required for other services. The processor 1602 reads a corresponding computer program from the non-volatile memory 1610 into the memory 1608 and then executes the computer program, to form an information importing apparatus at a logic level. In addition to a software implementation, one or more embodiments of this specification do not exclude other implementations, for example, logic devices or a software-hardware combination. That is, execution entities of the following processing procedures are not limited to logic units and may alternatively be hardware or logic devices.

Figure 17:
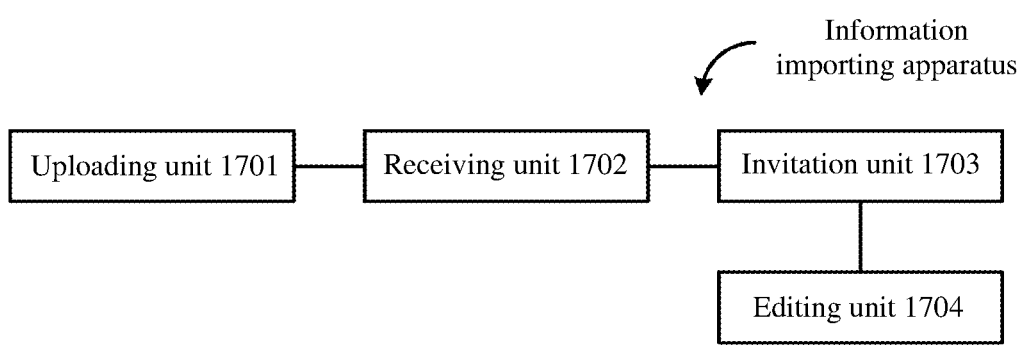
FIG. 17 is a block diagram of an information importing apparatus on a terminal side, according to an exemplary embodiment.

Referring to FIG. 17, in a software implementation, the information importing apparatus may include: an uploading unit 1701, configured to enable a terminal to upload an information importing file to a server, for the server to verify information included in the information importing file and import the information into a system; and a receiving unit 1702, configured to enable the terminal to receive an error comparison file returned by the server, where the error comparison file is generated by the server by marking information in the information importing file that does not pass the verification.

Optionally, the apparatus further includes: an invitation unit 1703, configured to enable the terminal to initiate a correction invitation to an information provider corresponding to the information in the information importing file that does not pass the verification, for the information provider to perform correction.

Optionally, the correction invitation is used for instructing the information provider to initiate an online correction request to the server, for the information provider to perform correction by using an online correction interface provided by the server; or the correction request is used for instructing the information provider to return corrected information corresponding to the information in the information importing file that does not pass the verification; and the apparatus further includes: an editing unit 1704, configured to: enable the terminal to edit the information importing file or the error comparison file according to the corrected information; or enable the terminal to initiate an online editing request to the server according to the corrected information, to perform editing by using an online editing interface provided by the server.

The system, the apparatus, the module or the unit described in the foregoing embodiments may be implemented by a computer chip or an entity, or implemented by a product having a certain function. A typical implementation device is a computer. A specific form of the computer may be a PC, a laptop computer, a cellular phone, a camera phone, a smartphone, a personal digital assistant, a media player, a navigation device, an email transceiver device, a game console, a tablet computer, a wearable device, or a combination of any of these devices.

In a typical configuration, the computer includes one or more processors (such as CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer include, but are not limited to, a phase-change memory (PRAM), a static random-access memory (SRAM), a dynamic random-access memory (DRAM), a RAM of another type, a ROM, an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which may be configured to store information accessible by a computing device. According to limitations of this specification, the computer-readable medium does not include transitory computer-readable media, such as a modulated data signal and a modulated carrier.

It should be further noted that the terms "include," "comprise," or any variants thereof are intended to cover a non-exclusive inclusion. Therefore, a process, method, article, or device that includes a series of elements not only includes such elements, but also includes other elements not specified expressly, or may include inherent elements of the process, method, article, or device. Without further limitation, the element defined by a phrase "include a/an . . ." does not exclude other same elements in the process, method, article or device which include the element.

Specific embodiments of this specification are described above. Other embodiments fall within the scope of the appended claims. In some cases, the actions or steps recorded in the claims may be performed in sequences different from those in the embodiments and an expected result may still be achieved. In addition, the process depicted in the accompanying drawings is not necessarily performed in the shown specific order or successively to achieve an expected result. In some implementations, multitasking and parallel processing may be feasible or beneficial.

The terms used in one or more embodiments of this specification are merely used to describe the specific embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like may be used to describe various information in one or more embodiments of this specification, such information should not be limited to these terms. These terms are merely used to distinguish between information of the same type. For example, without departing from the scope of one or more embodiments of this specification, first information may also be referred to as second information. Similarly, second information may also be referred to as first information. According to the context, the word "if" used herein may be interpreted as "during" or "when" or "in response to determining."

The foregoing descriptions are merely exemplary embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. An information importing method, comprising:
   receiving, by a server, an information importing file uploaded by a user, wherein the information importing file comprises information for importing into a system;
   verifying, by the server, the information included in the information importing file;
   marking, by the server, a field in the information importing file that does not pass the verification with a marking form, so as to generate a first tab of an error comparison file;
   generating, by the server, a second tab of the error comparison file, wherein the second tab comprises the marking form corresponding to the field that does not pass the verification, a problem corresponding to the field that does not pass the verification, and a solution corresponding to the problem;
   detecting, by the server, the marked field in the second tab of the error comparison file is triggered in response to an action by the user;
   displaying, by the server, an error prompt interface corresponding to the marked field triggered by the user;
   receiving, by the server, updated content for the marked field as a result of a correction operation performed on the error prompt interface;
   automatically verifying, by the server in real-time, the updated content; and
   in response to the updated content passing the verification, automatically restoring the marked field to a default form.

2. The method according to claim 1, wherein the information importing file comprises a plurality of pieces of information in a same format to be imported into the system in batches.

3. The method according to claim 1, wherein the marking, by the server, information in the information importing file that does not pass the verification comprises:
   adjusting, by the server, a display attribute of the information that does not pass the verification, to distinguish the information that does not pass the verification from information that passes the verification.

4. The method according to claim 1, further comprising generating, by the server, prompt information that is automatically displayable under the first tab when the information that does not pass the verification is triggered, wherein the prompt information comprises the problem corresponding to the information that does not pass the verification and the solution corresponding to the problem.

5. The method according to claim 1, wherein the marking, by the server, information in the information importing file that does not pass the verification comprises:
   when a piece of information included in the information importing file comprises a plurality of fields, marking, by the server, a problematic field in the information that does not pass the verification.

6. The method according to claim 1, further comprising:
   adding, by the server, error description information to the error comparison file, wherein the error description information comprises each problem existing in the information that does not pass the verification, a marking form corresponding to each problem, and a solution to each problem.

7. The method according to claim 1, further comprising: feeding, by the server, statistical data back to the user, wherein the statistical data comprises at least one of the following: a quantity of pieces of information that is successfully imported into the system, a quantity of pieces of information in the imported information that does not pass the verification, a quantity of pieces of information that does not pass the verification and that is not imported, each problem existing in the information that does not pass the verification, a marking form corresponding to each problem, and a solution to each problem.

8. The method according to claim 1, further comprising: receiving, by the server, an online viewing request initiated by the user, and returning a display page of the error comparison file to the user;
determining, by the server, information selected in the display page by the user; and
if the selected information does not pass the verification, updating, by the server, the display page to comprise error description information for the selected information.

9. The method according to claim 1, further comprising: receiving, by the server, an online editing request initiated by the user; and
editing, by the server, information in the error comparison file according to the online editing request.

10. The method according to claim 1, further comprising: receiving, by the server, an online correction request initiated by an information provider, wherein the online correction request is initiated by the information provider based on a correction invitation sent by the user; and
providing, by the server, an online correction interface to the information provider, wherein the online correction interface comprises related information in the information importing file that corresponds to the information provider, for the information provider to perform correction.

11. The method according to claim 10, wherein the online correction interface only comprises the related information corresponding to the information provider, wherein
the related information corresponding to the information provider comprises: all information provided by the information provider, or a problematic field in the information provided by the information provider.

12. The method according to claim 1, further comprising: uploading, by a terminal, the information importing file to the server, for the server to verify information included in the information importing file and import the information into the system; and
receiving, by the terminal, the error comparison file returned by the server.

13. The method according to claim 12, further comprising:
initiating, by the terminal, a correction invitation to an information provider corresponding to the information in the information importing file that does not pass the verification, for the information provider to perform correction.

14. The method according to claim 13, wherein:
the correction invitation is used for instructing the information provider to initiate an online correction request to the server, for the information provider to perform correction by using an online correction interface provided by the server; or
the online correction request is used for instructing the information provider to return corrected information corresponding to the information in the information importing file that does not pass the verification; and the method further comprises: editing, by the terminal, the information importing file or the error comparison file according to the corrected information; or initiating, by the terminal, an online editing request to the server according to the corrected information, to perform editing by using an online editing interface provided by the server.

15. One or more non-transitory computer-readable storage media storing instructions executable by one or more processors, wherein execution of the instructions causes the one or more processors to perform operations comprising:
receiving an information importing file uploaded by a user, wherein the information importing file comprises information for importing into a system;
verifying the information included in the information importing file;
marking a field in the information importing file that does not pass the verification with a marking form, so as to generate a first tab of an error comparison file, so as to generate a first tab of an error comparison file;
generating a second tab of the error comparison file, wherein the second tab comprises the marking form corresponding to the field that does not pass the verification, a problem corresponding to the field that does not pass the verification, and a solution corresponding to the problem;
detecting the marked field in the second tab of the error comparison file is triggered in response to an action by the user;
displaying an error prompt interface corresponding to the marked field triggered by the user;
receiving updated content for the marked field as a result of a correction operation performed on the error prompt interface;
automatically verifying, in real-time, the updated content; and
in response to the updated content passing the verification, automatically restoring the marked field to a default form.

16. The one or more non-transitory computer-readable storage media according to claim 15, wherein the information importing file comprises a plurality of pieces of information in a same format to be imported into the system in batches.

17. The one or more non-transitory computer-readable storage media according to claim 15, wherein the marking the field in the information importing file that does not pass the verification comprises:
adjusting a display attribute of the information that does not pass the verification, to distinguish the information that does not pass the verification from information that passes the verification.

18. The one or more non-transitory computer-readable storage media according to claim 17, wherein the display attribute comprises at least one of the following: a background color, a border color, a character color, a font, and a character size.

19. The one or more non-transitory computer-readable storage media according to claim 15, wherein the marking the field in the information importing file that does not pass the verification comprises:

when a piece of information included in the information importing file comprises a plurality of fields, marking a problematic field in the information that does not pass the verification.

20. A system comprising one or more processors and one or more non-transitory computer-readable memories coupled to the one or more processors and configured with instructions executable by the one or more processors to cause the system to perform operations comprising:

receiving an information importing file uploaded by a user, wherein the information importing file comprises information for importing into a system;

verifying the information included in the information importing file;

marking a field in the information importing file that does not pass the verification with a marking form, so as to generate a first tab of an error comparison file, so as to generate a first tab of an error comparison file;

generating a second tab of the error comparison file, wherein the second tab comprises the marking form corresponding to the field that does not pass the verification, a problem corresponding to the field that does not pass the verification, and a solution corresponding to the problem;

detecting the marked field in the second tab of the error comparison file is triggered in response to an action by the user;

displaying an error prompt interface corresponding to the marked field triggered by the user;

receiving updated content for the marked field as a result of a correction operation performed on the error prompt interface;

automatically verifying, in real-time, the updated content; and in response to the updated content passing the verification, automatically restoring the marked field to a default form.

* * * * *